Jan. 17, 1933. J. R. L. SANTOS 1,894,635
GAS HOLDER
Original Filed Aug. 29, 1928
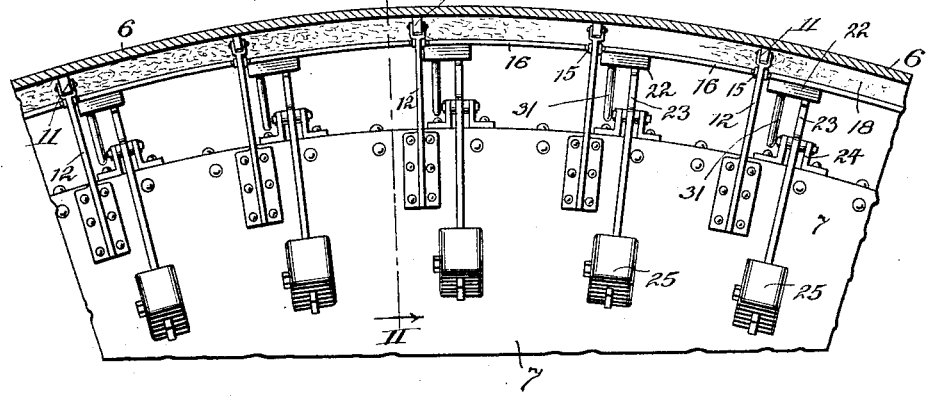
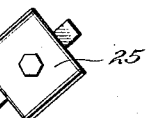
Inventor
John R. L. Santos
By
Attorneys Patented Jan. 17, 1933

1,894,635

UNITED STATES PATENT OFFICE

JOHN R. L. SANTOS, OF BALTIMORE, MARYLAND, ASSIGNOR TO THE BARTLETT HAYWARD COMPANY, OF BALTIMORE, MARYLAND, A CORPORATION OF MARYLAND

GAS HOLDER

Application filed August 29, 1928, Serial No. 302,787. Renewed March 25, 1932.

This invention relates to so-called waterless gas holders, particularly to a means for lubricating the piston where it seals against the walls of the holder.

Generally stated a waterless gas holder includes a shell or chamber of cylindrical or prismatic form having a piston which rests on the contained gas and moves up and down as the quantity of gas varies. The success of such holders is dependent upon the maintenance of a tight but approximately frictionless seal between the piston and the walls of the shell.

One known type of seal consists of a yielding packing ring commonly formed of felt and canvas and some means of supplying lubricant to keep the packing saturated. This lubricant is not only for the purpose of reducing friction but also for the purpose of perfecting the seal and the operation of the device is dependent on the maintenance of a constant and adequate supply of lubricant.

The present invention contemplates an arrangement in which the lubricant, such as oil, tar, etc., is supplied by a pump which is actuated by the up and down movements of the piston. Furthermore, it contemplates the supply of this lubricant in a quantity in excess of the actual demands and the return of any excess lubricant to the reservoir from which it is drawn.

The invention lends itself further to a convenient arrangement in which the reservoir of lubricant also forms part of a dip seal between the expansible packing element and the piston proper. This arrangement allows the packing to be mounted for quite free movement and insures that it will be forced into sealing engagement with the shell by the exertion of a minimum force.

The preferred embodiment of the invention is illustrated in the accompanying drawing, in which Figure 1 is a fragmentary plan partly in section; and Figure 2 is a fragmentary vertical section on an enlarged scale, the plane of section being indicated by line II—II of Figure 1.

A portion of the shell, where indicated as of cylindrical form, is illustrated at 6.

The piston proper includes a dome-like portion 7 having a peripheral depending skirt 8 smaller in diameter than the shell 6 and surrounded at its lower portion by a trough 9, open at its top and slightly smaller in diameter than the shell 6.

The piston is guided by a plurality of rollers 11 which are carried by brackets 12 and which contact the interior of the shell 6, and a plurality of rollers 13 supported below the trough 9 on brackets 14. These brackets 14 may be of any suitable type but are here shown as formed of channel iron.

Pivotally supported at 15 on the brackets 12 is a circular partition 16 which is formed of flexible material preferably metal which extends downward into the trough 9 so as to dip in the liquid lubricant 17 contained in the trough.

The partition 16 carries a packing structure made up of a plurality of annuli 18 spaced apart to leave grooves. The upper one 19 is a lubricant distributing groove and the lower one 21 is a lubricant collecting groove. The exact construction of the packing members 18 is immaterial but they can be conveniently constructed of laminæ of canvas and felt or any other known material.

The partition 16 is backed up adjacent the ribs 18 by a plurality of thrust blocks 22 which transmit to the partition 16 substantially continuously the thrust of a plurality of levers 23. These levers are pivoted on brackets 24 and carry loading weights 25 whose function is to exert the thrust through the levers onto the blocks 22 and thus expand the partition 16 and the packing ribs 18 so that the latter seal against the shell 6.

The liquid 17 and the partition 16 form a dip seal allowing free movement of the partition 16. The difference in liquid level on opposite sides of the partition 16 is occasioned by the pressure of the gas confined below the piston.

Mounted on the brackets 14, or certain of them, are plunger pumps 26 which are driven through crank pins 27 and connecting rods 28 by the rollers 13.

While only one pump is illustrated in the drawing it will be understood that a plurality of such pumps would be ordinarily used. It is not necessary that there be a pump for each roller 13 but it is desirable that there be a plurality of pumps at intervals around the holder. Each pump draws lubricant from the trough 9 through ports 28 and discharges it through a corresponding flexible pipe 31 to a port 32 which leads through the partition 16 into the groove 19. In this way lubricant is supplied to the groove 19. This tends to flow downwardly and the major portion of it is collected in groove 21 from which it is drained back to the trough 9 through the drain connections 33.

The pump 26 operates in the same manner regardless of the direction of rotation of its roller 13 so that as the piston moves either up or down lubricant is drawn from the trough 9 and delivered through the pipe 31 to the groove 19. The groove 21 collects excess lubricant and returns it through the drains 33 to the trough 9. In this way the major portion of the lubricant is recovered and returned to the trough and there is in effect a constant circulation of lubricant from the trough to the packing and back to the trough.

While I prefer the construction shown, various modifications are possible within the scope of the invention and no limitation to the specific structure illustrated is implied except to the extent specified in the claims.

What is claimed is:

1. In a waterless gas holder, the combination of a shell; a piston vertically movable in said shell to vary the effective volume thereof; a packing surrounding and carried by said piston and contacting said shell; a lubricant reservoir; and pumping means actuated by the movement of the piston and serving to deliver lubricant from said reservoir to said packing.

2. In a waterless gas holder, the combination of a shell; a piston vertically movable in said shell to vary the effective volume thereof; a packing surrounding and carried by said piston and contacting said shell, and having a lubricant groove; a lubricant reservoir; and pumping means actuated by the movements of the piston and serving to deliver lubricant from said reservoir to said lubricant groove.

3. In a waterless gas holder, the combination of a shell; a piston vertically movable in said shell to vary the effective volume thereof; a packing surrounding and carried by said piston and contacting said shell, and having a lubricant distributing groove and a lubricant collecting groove; a lubricant reservoir; a drain connection from the lubricant collecting groove to said reservoir; and pumping means actuated by the movements of the piston and serving to deliver lubricant from the reservoir to the lubricant distributing groove.

4. In a waterless gas holder, the combination of a shell; a piston vertically movable in said shell to vary the effective volume thereof; a packing surrounding and carried by said piston and contacting said shell, and having a lubricant distributing groove and a lubricant collecting groove below the distributing groove; a lubricant reservoir; a drain connection from the lubricant collecting groove to said reservoir; and pumping means actuated by the movements of the piston and serving to deliver lubricant from the reservoir to the lubricant distributing groove.

5. In a waterless gas holder, the combination of a shell; a piston vertically movable in said shell to vary the effective volume thereof, said piston having a peripheral trough to retain liquid lubricant; an annular flexible wall suspended on said piston and dipping into the lubricant in said trough to form therewith a dip-seal; packing carried by said partition and contacting said shell; yielding means tending to deflect said wall and force said packing into sealing relation with said shell; and pump means operable by movements of the piston and serving to deliver lubricant from said trough to said packing.

6. In a waterless gas holder, the combination of a shell; a piston vertically movable in said shell to vary the effective volume thereof, said piston having a peripheral trough to retain liquid lubricant; an annular flexible wall suspended on said piston and dipping into the lubricant in said trough to form therewith a dip-seal; packing carried by said partition and contacting said shell, said packing having a lubricant distributing groove and a lubricant collecting groove; yielding means tending to deflect said wall and force said packing into sealing relation with said shell; a drain connection from the lubricant collecting groove to said reservoir; and pump means operable by movements of the piston and serving to deliver lubricant from said trough to said lubricant distributing groove.

7. In a waterless gas holder, the combination of a shell; a piston vertically movable therein and having guide rollers engaging the shell; a packing and a lubricant reservoir carried by said piston; and pumping means driven by at least one of said guide rollers and arranged to deliver lubricant from said reservoir to said packing.

In testimony whereof I have signed my name to this specification.

JOHN R. L. SANTOS.